Figure 1:
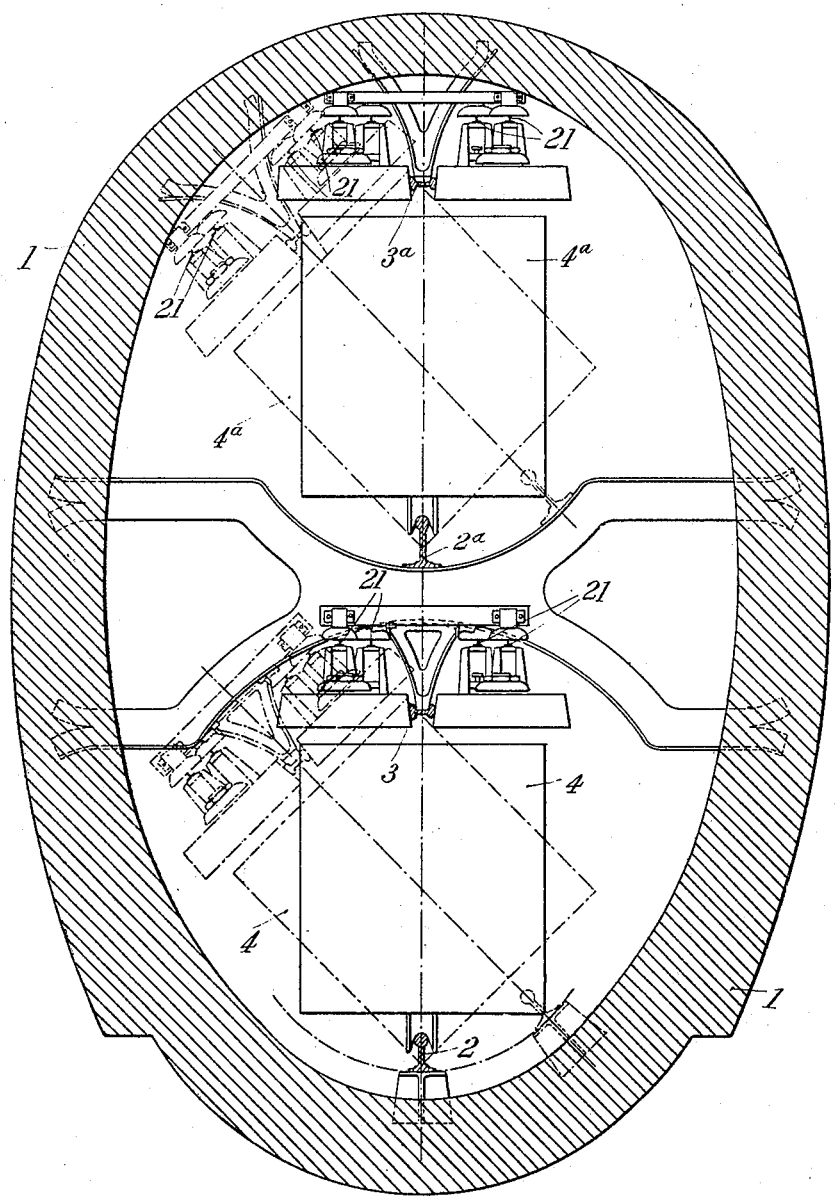

No. 784,269. PATENTED MAR. 7, 1905.
D. MONNIER.
CONSTRUCTION OF RAILWAYS AND VEHICLES FOR TRANSPORTING
LIGHT LOADS AT HIGH SPEED.
APPLICATION FILED AUG. 25, 1903.

4 SHEETS—SHEET 1.

Witnesses:
Henry Thieme
George Barry Jr.

Inventor:
Dimitri Monnier
By attorneys
Brown & Seward

No. 784,269. PATENTED MAR. 7, 1905.
D. MONNIER.
CONSTRUCTION OF RAILWAYS AND VEHICLES FOR TRANSPORTING
LIGHT LOADS AT HIGH SPEED.
APPLICATION FILED AUG. 25, 1903.
4 SHEETS—SHEET 2.
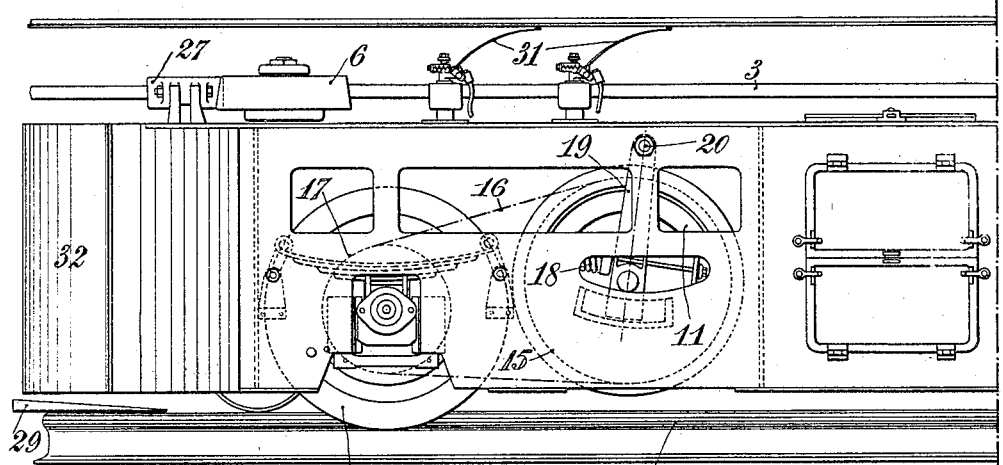
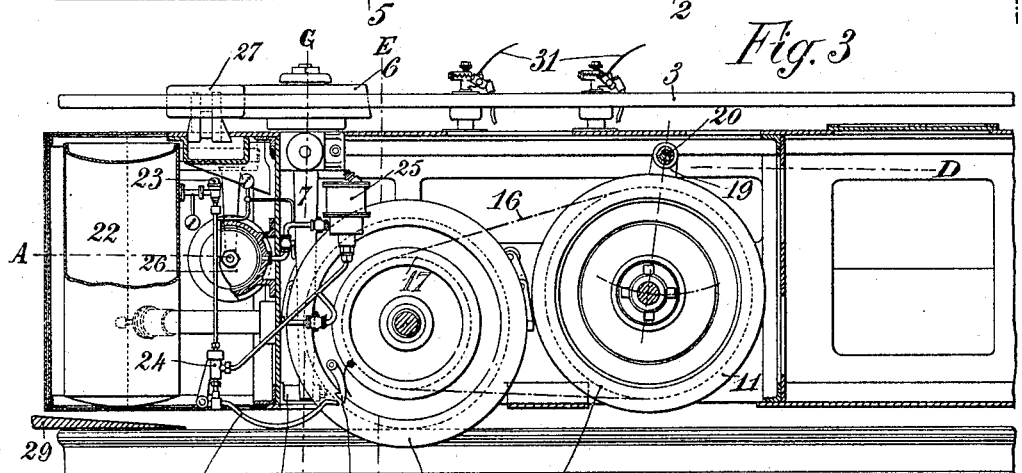
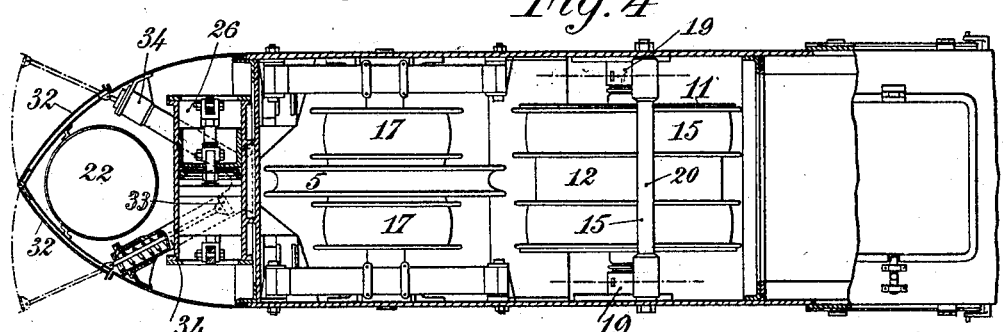
Witnesses:
Henry Thieme
George Barry Jr.
Inventor:-
Dimitri Monnier
by attorneys
Brown & Seward No. 784,269. PATENTED MAR. 7, 1905.
D. MONNIER.
CONSTRUCTION OF RAILWAYS AND VEHICLES FOR TRANSPORTING
LIGHT LOADS AT HIGH SPEED.
APPLICATION FILED AUG. 25, 1903.
4 SHEETS—SHEET 3.
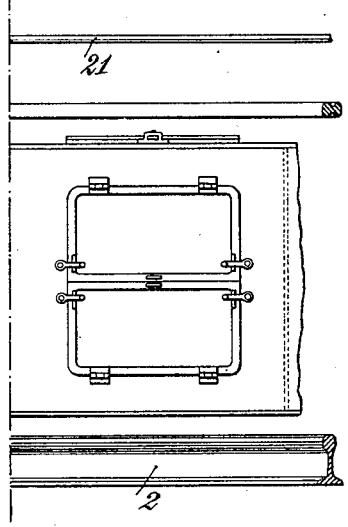
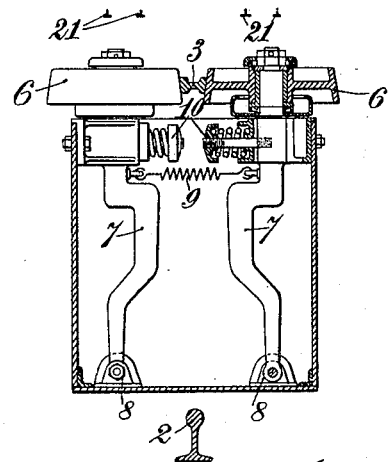
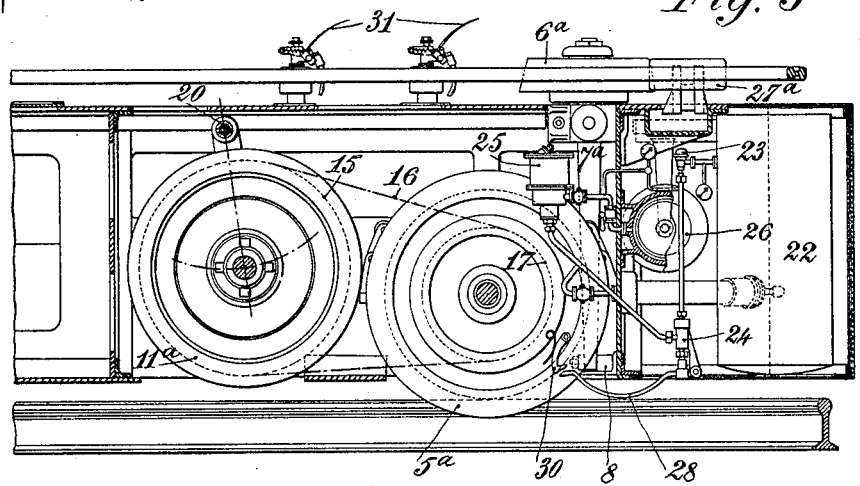
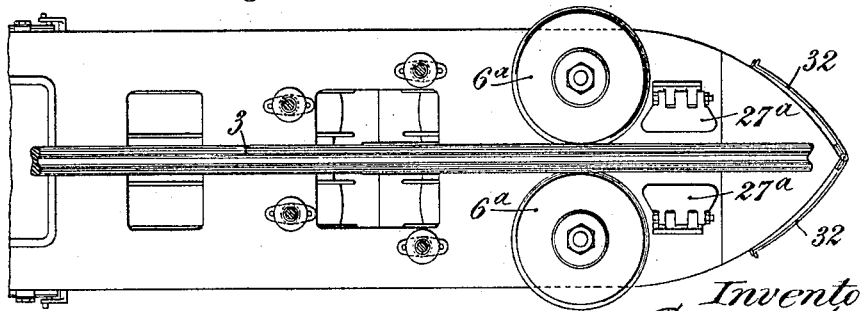
Witnesses:
Henry Thiem
George Barry Jr
Inventor:
Dimitri Monnier
By a Attorneys
Brown & Seward No. 784,269. PATENTED MAR. 7, 1905.
D. MONNIER.
CONSTRUCTION OF RAILWAYS AND VEHICLES FOR TRANSPORTING
LIGHT LOADS AT HIGH SPEED.
APPLICATION FILED AUG. 25, 1903.
4 SHEETS—SHEET 4.

No. 784,269.

Patented March 7, 1905.

UNITED STATES PATENT OFFICE.

DIMITRI MONNIER, OF PARIS, FRANCE.

CONSTRUCTION OF RAILWAYS AND VEHICLES FOR TRANSPORTING LIGHT LOADS AT HIGH SPEED.

SPECIFICATION forming part of Letters Patent No. 784,269, dated March 7, 1905.

Application filed August 25, 1903. Serial No. 170,719.

*To all whom it may concern:*

Be it known that I, DIMITRI MONNIER, electrical engineer, a citizen of the Republic of France, residing at 53 Rue de Chateaudun, Paris, France, have invented a new and useful Construction of Railways and Vehicles for Transporting Light Loads at High Speeds, of which the following is a specification.

This invention relates to the construction of a railway and vehicles for the electrical transport of letters, light parcels, and the like whereby a speed of at least two hundred and fifty kilometers per hour under good practical conditions can be attained.

The invention comprises both the construction of the railway or conduit and of the vehicles for the transport. There are preferably provided two lines of rail, one for the transport in one direction and the other for that of the other direction, and the two lines being arranged one above the other in a closed conduit tunnel or tube. The lines consist each of a single running-rail with a guide-rail, the latter being arranged above the vehicle, which embraces it with two pairs of horizontal rollers. The sectional form of the conduit or tube in which the lines of rail are laid, as also the form of the supports for the rails, are such that neither the one nor the other requires to be modified at the curves, while allowing the vehicles to assume an inclined position to the extent required by the high speed. The vehicle has two running-wheels and two electromotors, each driving one of the wheels. Each motor comprises a central stator and a rotor, the casing of which forms two pulleys, over which pass belts that drive two pulleys on the axle of the corresponding running-wheel. Owing to this mode of transmission by belts, the motor can be attached to the framework of the vehicle, although this be mounted on springs. This also allows of the motor being worked at the speed at which it gives the greatest useful effect or which is best suited for the distribution of the electric current, as it is not requisite that it should revolve at the same speed as the running-wheel which it drives.

The chamber of the vehicle for containing the objects to be transported is arranged between the two motors.

The vehicle is provided with special devices for effecting, in addition to the electric braking, a mechanical braking by the application of brake-blocks against the guide-rail and also a retarding action by the spreading of wings or movable shutters which serve to increase the resistance of the air to the motion of the vehicle.

Figure 6:
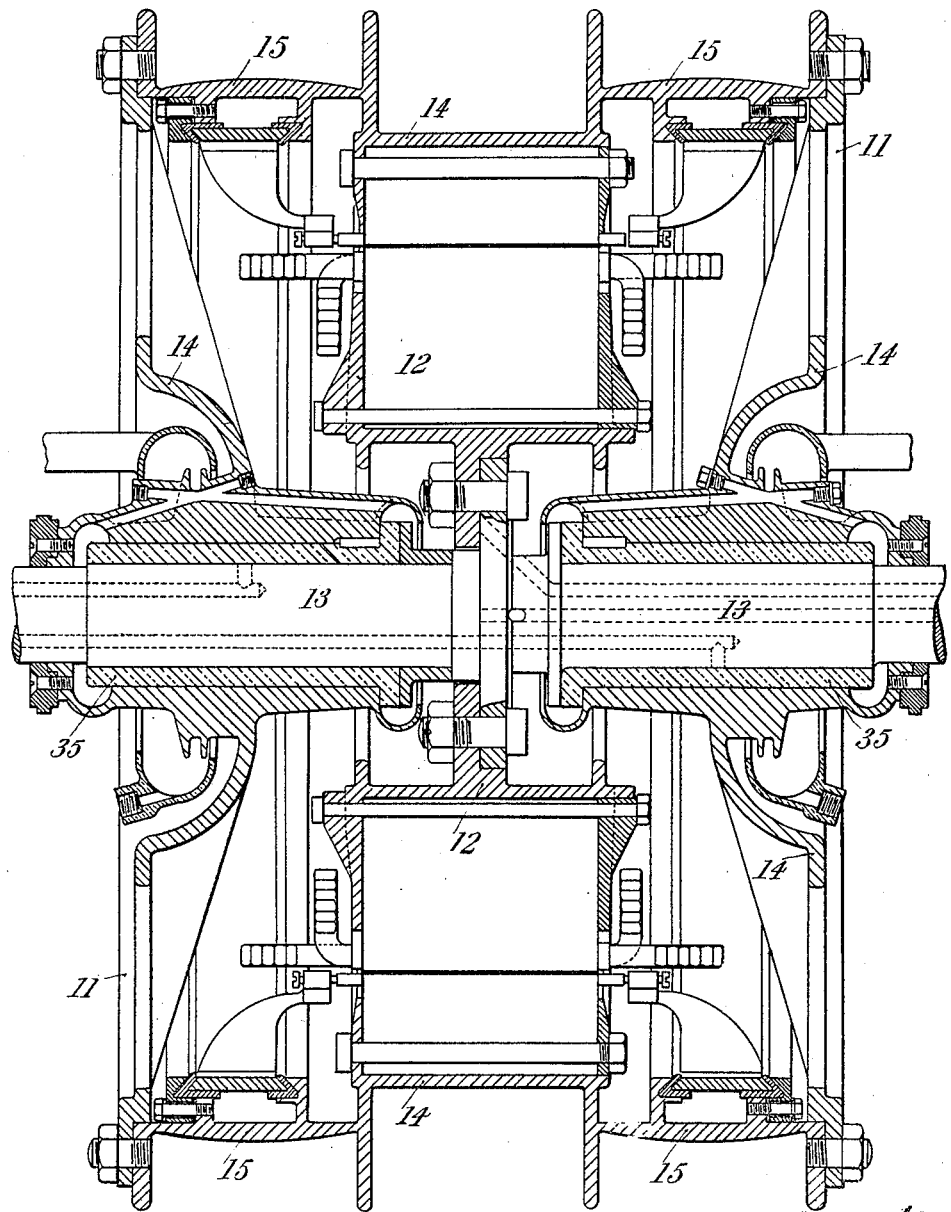

On the accompanying drawings, Figure 1 shows a cross-section of a closed conduit or tube with two superposed lines of rail, the inclined positions of the lines of rail and of the vehicles being indicated in dotted lines. Figs. 2 and 2* show a part side elevation of a vehicle. Figs. 3 and 3* show a complete vertical section. Figs. 4 and 4* represent a part-horizontal section approximately on line A D, Fig. 3, and a part plan. Fig. 5 is a cross-section on lines E F and G H, Fig. 3. Fig. 6 is a horizontal section through the axis of one of the two motors, which are identical.

In Fig. 1 of the drawings, 1 is the conduit or tube, 2 is the running-rail, and 3 the guide-rail, of the lower line, and $2^a$ and $3^a$ the rails of the upper line. At 4 and $4^a$ are shown the vehicles. In the curves the vehicle tends to assume a more or less horizontal position in consequence of the centrifugal action. The rails are in consequence so arranged as to cause the vehicle to assume an inclination which is the resultant of the direction of gravity and that of the centrifugal force, as indicated by the dotted lines. The inclination may be considerable in curves of small radius, such as forty-five degrees for a speed of about two hundred and fifty kilometers per hour. In order that the supports for the rails may be suited to receive these, no matter what the degree of inclination may be, either as regards the conduit or the bearers, the supporting-surfaces are formed as surfaces of rotation whose central axis coincides with the center of gravity of the vehicle. By this means when the vehicle enters a curve its center of gravity will not be subject to any lateral displacement. The supporting-surfaces for the running and guide rails being of cylindrical form, the rail can be fixed to any point thereof which simplifies the construction.

In Figs. 2 to 5 of the drawings, 5 5ª are the two driving-wheels of the vehicle; 6 6 and 6ª 6ª, the two pairs of horizontal guide-rollers which are mounted on vertical axes 7 7 and 7ª 7ª, the lower ends of which can turn on articulated joints 8 8ª.

A spring 9, Fig. 5, keeps the rollers permanently in contact with the rail 3. Two other springs 10 10 transmit to the framing the strains to which the rollers may be subject. These strains would only be occasional. They may result either from momentary pressure when the vehicle enters a curve or from a stoppage or retardation on an inclined part of the line.

Each of the wheels 5 5ª of the vehicle is driven, as stated, by an electromotor 11 11ª, which is preferably one worked by polyphase currents. It is composed of a central fixed support 12, Fig. 6, bolted to a collar on the fixed shaft 13, and a rotor 14, that turns round this shaft upon bearings 35, carried thereby.

The casing of the rotor constitutes two pulleys 15 15, which by means of two belts 16 16, Figs. 2 and 3, transmit to the corresponding wheel 5 or 5ª the rotary effort of the motor. For this purpose the wheel carries two pulleys 17 17. The uniform tension of the belt is insured, notwithstanding its limited length and the displacements resulting from the yielding of the suspension-springs, by means of two springs 18, which act on the motor that is suspended from beams 19, pivoted on the axis 20, Figs. 2, 3, 4. This construction, which preserves the independence of the axles, enables the vehicles to be made only slightly larger in width than the motor.

The current can be supplied to the motors by means of sliding contacts 31 from three conductors 21 21 21, extended along the tunnel. The running and guide rails might also be utilized as conductors, as also any other metallic structure in the tunnel. A fourth conductor 21 is employed for transmitting an indication of the position of the vehicle. These conductors are fixed, by means of insulating-supports, to the bearers that carry the guide-rail 3, so as always to remain in the same position relatively to the rail, and consequently to the vehicle.

As the vehicle is intended to run at a great speed, the natural stopping distance would be very considerable. In order to shorten this, braking devices are employed, having the following effect: first, to increase momentarily the resistance offered by the air; secondly, to apply brake-blocks to the guide-rail; thirdly, to produce by means of the motors a retarding-couple. These several devices are combined in the following manner: At the point where the braking is to be produced the conductors are momentarily interrupted and are then continued by a section in which the current can be transposed in two of the phases, so as to invert the direction of rotation of the motor-field. By this means the electric braking is effected. Should there be a stoppage of the current from any cause, so that there would be a risk of the vehicle passing the station, this is prevented by bringing the mechanical brakes into action, as follows: The vehicle carries at each end a compressed-air reservoir 22, Figs. 3 and 4, which by means of a reducing-valve 23 and two valves 24 25 supplies a brake-cylinder 26, which applies the brake-blocks 27 and 27ª to the guide-rail 3. The valve 24 is controlled by a lever 28, which on entering the section where the braking is to be effected comes in contact with a fixed incline 29 and is thereby made to open the valve, so as to admit air-pressure to the brake-cylinder. The lever is held in that position by a spring-catch 30 so long as the vehicle is on the said section. The second valve, 25, which is interposed between the valve 24 and the brake-cylinder, is electrically controlled by an electromagnet, which being included in one of the circuits of the motor or in the circuit of the fourth conductor keeps the valve 25 closed so long as current is being supplied. When the current is interrupted, the valve 25 opens and valve 24 being also open air-pressure passes to the brake-cylinder. Thus it will be seen that by a series of emissions and interruptions of current effected from the station the braking action can be controlled at will. The braking action is, furthermore, assisted by that of the four wings or shutters 32, two at each end of the vehicle. These shutters, which are closed normally, are fixed to pistons 33 in cylinders 34, that can communicate with the valve 24, so that on the opening of this valve by the lever 28 air-pressure is admitted to the cylinders 34, causing the pistons to open the shutters, and thereby to increase the resistance to the passage of the vehicle through the air.

Having now particularly described and ascertained the nature of my said invention and in what manner the same is to be performed, I declare that what I claim is—

1. Railway and apparatus for the transport of light loads, consisting of one or more lines of rail contained in a closed conduit tunnel or tube, each line consisting of a single running-rail and an upper guide-rail, the supports of such rails being constituted by surfaces of revolution whose central axis coincides with the center of gravity of the vehicle, and secondly of a vehicle mounted on springs and provided with two running-wheels each of which is driven through the medium of belts from an electric motor suspended from the framing by pivoted beams substantially as described.

2. In transporting apparatus of the kind herein described, the arrangement of the electromotors that drive the running-wheels with a central fixed support suspended from beams pivoted to the casing and a rotor the outer casing of which constitutes two pulleys that drive by means of belts corresponding pulleys on the axle of the running-wheels, the required tension of the belts being effected by springs acting on the motor so as to tend to draw it away from the wheel-axle, substantially as described.

In testimony that I claim the foregoing as my invention I have signed my name, in presence of two witnesses, this 7th day of August, 1903.

DIMITRI MONNIER.

Witnesses:
 GEORGE E. LIGHT,
 ALCIDE FABE.